United States Patent [19]

Weymouth, Jr.

[11] Patent Number: 4,933,119
[45] Date of Patent: Jun. 12, 1990

[54] MOLDING APPARATUS AND METHOD

[75] Inventor: Russell F. Weymouth, Jr., Charlton Depot, Mass.

[73] Assignee: Gentex Corporation, Carbondale, Pa.

[21] Appl. No.: 307,185

[22] Filed: Feb. 1, 1989

Related U.S. Application Data

[63] Continuation of Ser. No. 107,767, Oct. 13, 1987, abandoned.

[51] Int. Cl.⁵ .................................................. B29D 11/00
[52] U.S. Cl. .................................... 264/1.1; 264/2.2; 264/297.8; 264/328.7; 425/159; 425/344; 425/352; 425/588; 425/808
[58] Field of Search ............... 425/130, 145, 147, 149, 425/555, 588, 159, 808, 344, 352, 354, 355; 264/1.1, 2.2, 40.1, 40.5, 297.8, 328.7

[56] References Cited

U.S. PATENT DOCUMENTS

| | | | |
|---|---|---|---|
| 2,532,501 | 12/1950 | Johnson | 425/808 X |
| 2,658,237 | 11/1953 | Cuppett et al. | 425/555 X |
| 3,110,929 | 11/1963 | Perret | 425/808 X |
| 4,008,031 | 2/1977 | Weber | 264/2.2 X |
| 4,208,365 | 6/1980 | LeFevre | 264/2.2 |
| 4,254,065 | 3/1981 | Ratkowski | 425/808 X |
| 4,284,591 | 8/1981 | Neefe | 425/808 X |
| 4,364,878 | 12/1982 | Laliberte et al. | 264/2.2 |
| 4,540,534 | 9/1985 | Grendol | 264/2.2 |
| 4,609,138 | 9/1986 | Harrison | 425/588 X |
| 4,664,854 | 5/1987 | Bakalar | 264/2.2 |
| 4,678,420 | 7/1987 | Inoue | 425/145 X |
| 4,828,769 | 5/1989 | Maus et al. | 264/1.3 |

FOREIGN PATENT DOCUMENTS

| | | | |
|---|---|---|---|
| 148055 | 11/1979 | Japan | 264/2.2 |
| 209540 | 12/1983 | Japan | 425/588 |
| 219026 | 12/1983 | Japan | 264/2.2 |
| 125820 | 6/1986 | Japan | 425/808 |
| 249728 | 11/1986 | Japan | 425/555 |

Primary Examiner—Richard L. Chiesa
Attorney, Agent, or Firm—Shenier & O'Connor

[57] ABSTRACT

Apparatus and method for molding a plurality of articles having various masses and shapes wherein a parison mass is injected at constant back pressure through a time controlled valve from a supply of molten molding material at predetermined temperature and pressure. The articles are compression molded at predetermined pressures in accordance with their shapes or masses. The variable compression pressures are provided in one embodiment by similar actuators which are unequally excited; and in another embodiment an actuator is coupled to a mold cavity by a machine having a variable mechanical advantage. The actuators are pivotally mounted. A series of lenses including negative powers is particularly contemplated.

14 Claims, 2 Drawing Sheets

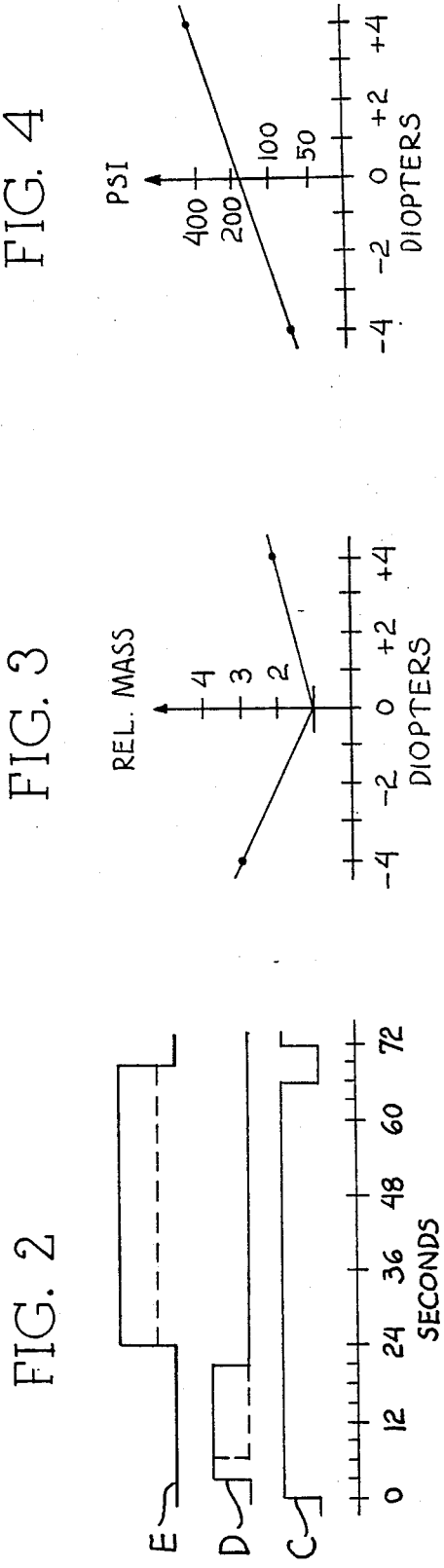
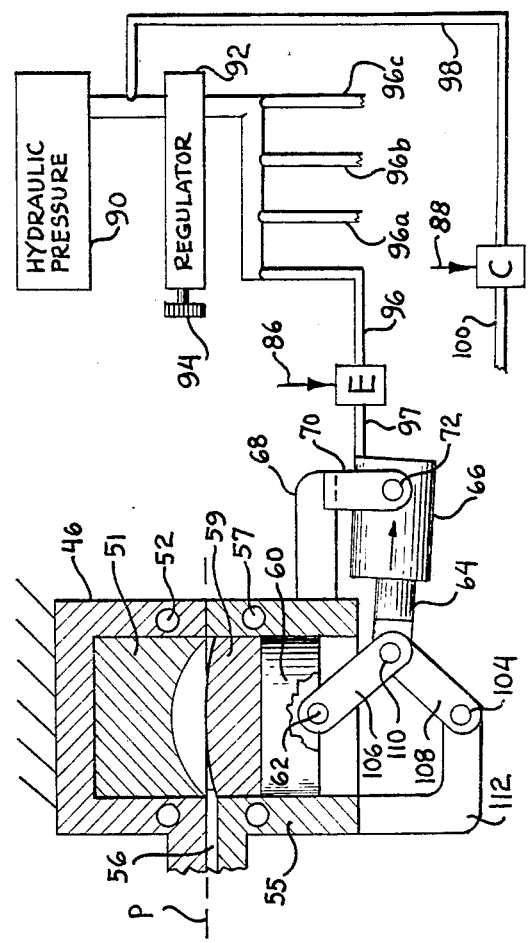
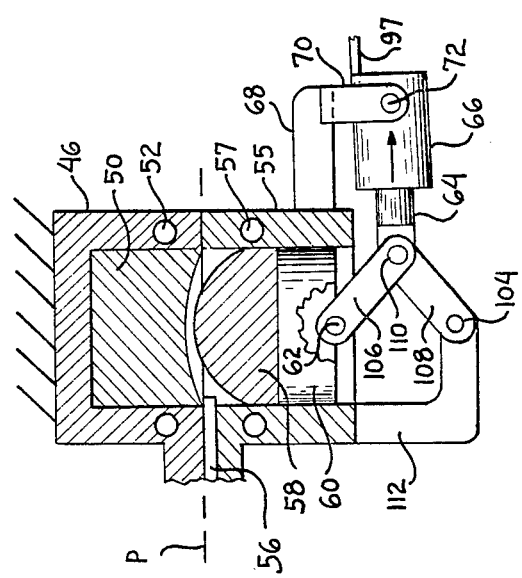

MOLDING APPARATUS AND METHOD

This is a continuation of co-pending application Ser. No. 107,767 filed on Oct. 13, 1987 now abandoned.

SUMMARY OF THE INVENTION

My invention relates to apparatus and method for molding one or more articles of various masses and shapes, such as a series of ophthalmic lenses having different optical powers. To avoid witness lines in the finished article, a parison mass of a molten plastic is injected without back pressure into a variable volume mold cavity which is thereafter compressed to produce pressure within the mold cavity. I have found that the parison mass is most efficiently governed by providing a supply of molding material at a temperature sufficiently elevated to render it molten, and at a predetermined elevated pressure. The molten material is connected through a valve to the mold cavity; and the mass of molding material which flows is governed by controlling the period of time during which the valve is open. I further found that the pressure of compression molding should be varied as a function of the shape or mass of the article. For example, a lens of high negative power should have a low molding pressure; and a lens of high positive power should have a high molding pressure. I may provide these variable molding pressures by an actuator which is variably energized. Alternatively I may achieve these variable molding pressures by employing a machine having a variable mechanical advantage which is driven by an actuator of fixed energization.

One object of my invention is to provide molding apparatus in which the flow of a parison mass of molten molding material at a predetermined elevated pressure is governed by controlling the period of actuation of a valve.

Another object of my invention is to provide compression molding apparatus wherein the compression pressure on the parison mass within a variable volume mold cavity is governed in accordance with the shape or mass of the article to be molded.

A further object of my invention is to provide compression molding apparatus wherein the compression pressure is governed by a machine of variable mechanical advantage.

Other and further objects of my invention will appear from the following description.

In general my invention contemplates the provision of a variable volume mold cavity including a movable piston. A supply of molten molding material at a predetermined elevated temperature and a predetermined elevated pressure is coupled through an actuatable valve to the molding cavity. The valve is actuated for a predetermined period of time to permit free viscous flow of a parison mass into the mold cavity with constant pressure therein, which is generally atmospheric. Subsequent compression of the molten material within the mold cavity is achieved by an actuator which is coupled to the piston either directly or through a machine of variable mechanical advantage. In the first case the compression pressure is governed by varying the excitation of the actuator. In the second case the actuator may have fixed excitation, while the mechanical advantage of the machine may be varied. One such machine of variable mechanical advantage may comprise an eccentric or crank in conjunction with a connecting rod coupling the eccentric or crank to the piston.

THE PRIOR ART

Laliberte U.S. Pat. No. 4,364,878 shows parison compression molding apparatus wherein the parison mass is provided by an auxillary piston and cylinder which injects a predetermined volume of the molten molding material into the mold cavity. Such apparatus is mechanically complex even for molding a single article; and becomes even more so where a plurality of articles of different shapes and masses are to be molded.

Bakalar U.S. Pat. No. 4,664,854 shows apparatus for molding a plurality of articles of different masses and shapes wherein the parison mass is controlled by limit stops on the variable volume mold cavities. Molten plastic is injected until a limit stop is reached whereupon the back pressure within the mold cavity rises to equality with the injection pressure and no further flow of molten plastic occurs. The apparatus of Bakalar produces witness lines in lenses of negative powers because the limit stop prevents the cavity from achieving a volume greater than that of the injected plastic so that the pressure within the mold cavity remains substantially constant. The reference further applies equal pressures to each of the mold cavities irrespective of whether the charges therein have the same or different masses or shapes.

BRIEF DESCRIPTION OF THE DRAWINGS

FIG. 2 is a graph showing the time relationship between electrical actuation of various components.

FIG. 3 is a graph showing the relative mass of a typical series of lenses of various powers.

FIG. 4 is a graph showing representative compression molding pressures of a series of lenses of various powers.

FIG. 5 is a fragmentary sectional elevation of a second embodiment of my invention providing a relatively low compression pressure for molding a lens of high negative power.

FIG. 6 is a fragmentary sectional elevation of the second embodiment of my invention providing a relatively high compression pressure for molding a lens of less negative or even positive power.

DESCRIPTION OF THE PREFERRED EMBODIMENTS

Figure 1:
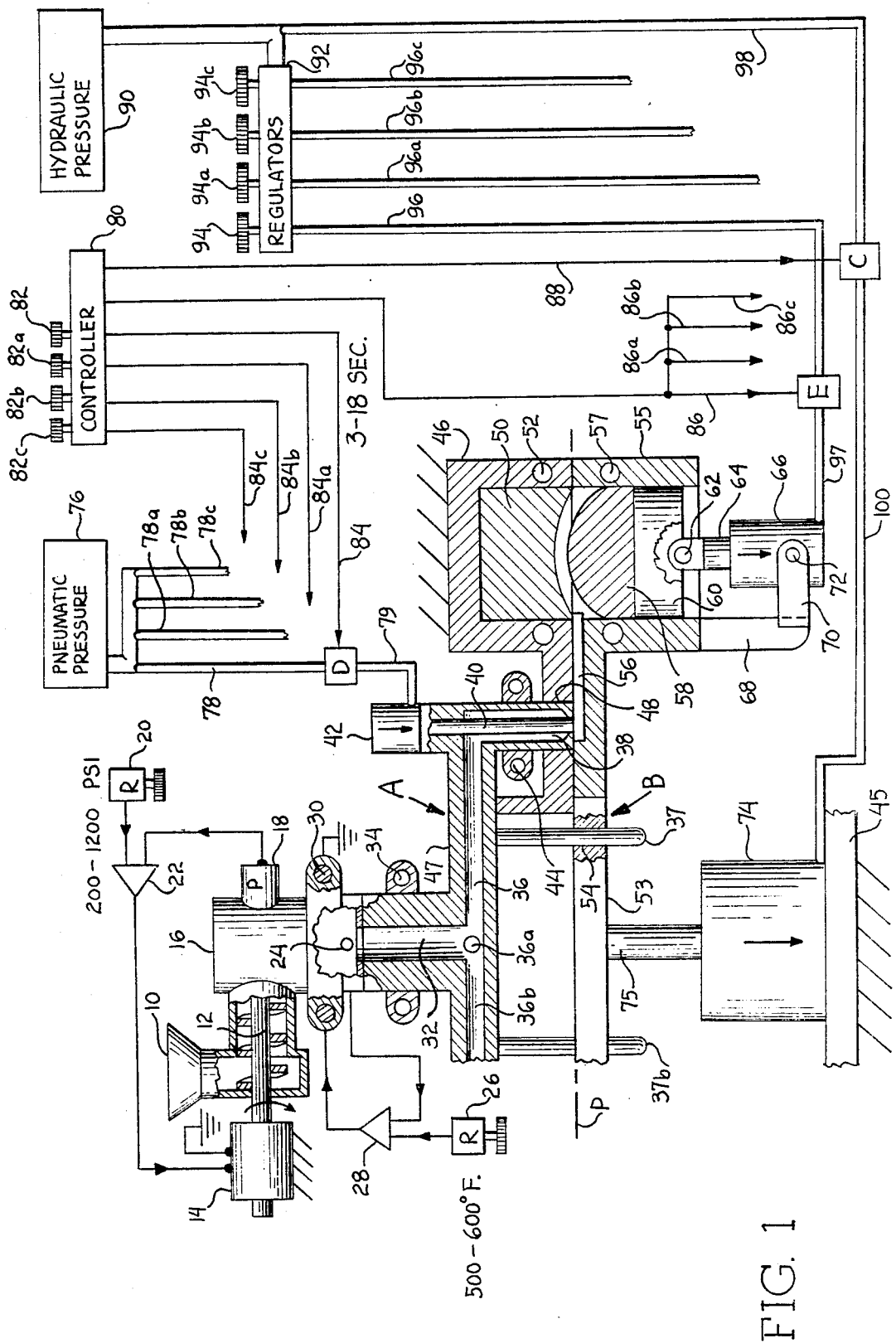
FIG. 1 is a fragmentary sectional elevation with parts broken away showing one embodiment of my invention.

Referring now to FIG. 1 of the drawings, into a hopper 10 are loaded granules of a plastic such as polycarbonate. The granules are conveyed by a screw 12 into a chamber or barrel 16. Screw conveyor 12 is rotated by a variable speed servomotor 14. The barrel 16 is heated by an electrical heater 30. A barrel temperature sensor 24 is coupled to one input of a differential amplifier or comparator 28 which is supplied with an electrical signal from a manually adjustable reference source 26 scaled to represent a value in the range of 475° to 625° F. or alternatively a value in a more narrow range of 500° to 600° F. The output of differential amplifier 28 excites heater 30 to maintain the temperature of the molten plastic within barrel 16 at the reference value. Current flows from amplifier 28 through heater 30 to circuit ground. Barrel 16 is further provided with a pressure sensor 18 which is coupled to one input of a comparator or differential amplifier 22. Comparator 22 is provided with an electrical signal from a manually adjustable reference source 20 which is scaled to represent from 200 to 1200 pounds per square inch. The output of differential amplifier 22 drives servomotor 14 to maintain the pressure within barrel 16 at the reference value. Current flows from amplifier 22 through motor 14 to circuit ground. Reference sources 20 and 26, sensors 18 and 24, and amplifiers 22 and 28 are also provided with circuit ground connections, not shown. Molten plastic flows through a sprue 32, provided with a sprue heater 34, into a manifold 47 which is provided with four passages including 36, 36a and 36b, one for each of four corresponding molds. Passage 36 is coupled to a valve including a nozzle 38 and a vertically moving control rod 40 of a pneumatic actuator 42. In the downward position of control rod 40 shown the valve is closed. Rod 40 may be resiliently biased to this position. Pneumatic pressure may be admitted through pipe 79 to raise control rod 40 and permit molten plastic to flow. Nozzle 38 is provided with a nozzle heater 44.

A stationary mold member 46 mounts a concave insert 50 which shapes the outer or convex surface of a negative lens. Nozzle 38 extends through a mating hole 48 bored in mold member 46. Mold member 46 is maintained at an elevated temperature by heater 52. The manifold 47 is provided with a plurality of, for example, four depending pins such as 37 and 37b. The foregoing elements constitute the stationary or "A" side of the mold, where P indicates a horizontal parting plane.

The "B" or movable side of the mold includes a spider or square member 53 which is mounted on the rod 75 of an hydraulic actuator 74 resiliently biased downwardly, away from the position shown where it is maintained by hydraulic pressure through pipe 100. Pins 37 and 37b extend through corresponding holes, such as 54, in member 53. Secured to the spider 53 is a mold member 55. A cold runner 56 is formed in member 55 and extends from the nozzle 38 into the mold cavity below the parting plane P. The cold runner 56 may be of any suitable cross-sectional shape and is shown as being rectangular with a depth of for example 2 mm. Inside member 55 is mounted a movable piston 60 to which is secured a convex mold insert 58 which shapes the inner or concave surface of a negative lens. Member 55 is maintained at an elevated temperature by a heater 57. Secured to member 55 is a bracket 68 mounting a yoke 70. Yoke 70 supports a pivotable hydraulic actuator 66 by means of a pin 72. Hydraulic actuator 66 is provided with an output rod 64 which is normally biased resiliently in a downwardly direction. Rod 62 is pivotally connected to cylinder 60 by a pin 62. Hydraulic pressure on line 97 forces rod 64 upwardly to the position shown. Pivots 62 and 72 permit the axes of rod 64 and piston 62 to be or become misaligned without torquing or cocking piston 60. A source of pneumatic pressure 76 provides compressed air to lines 78, 78a, 78b and 78c. Line 78 is connected through a valve D to line 79. Lines 78a, 78b and 78c are connected to corresponding valves for the other three molds. A time interval controller 80 is provided with manual adjustments 82, 82a, 82b and 82c to produce actuating signals of three to eighteen seconds duration on respective lines 84, 84a, 84b and 84c. Line 84 electrically actuates valve D. Lines 84a, 84b and 84c electrically actuate the corresponding valves for the other three molds.

A source of hydraulic pressure 90 is connected to regulators 92 provided with manual adjustments 94, 94a, 94b and 94c to produce regulated pressures on respective lines 96, 96a, 96b and 96c. Line 96 is connected through a valve E to line 97. Lines 96a, 96b and 96c are connected to corresponding valves for the other three molds. Hydraulic pressure source 90 is also connected to a line 98 which is coupled through a valve C to line 100. Controller 80 further provides electrical signals on lines 86, 86a, 86b and 86c. The signal on line 86 electrically actuates valve E. Lines 86a, 86b and 86c electrically actuate the corresponding valves for the other three molds. Controller 80 further provides a signal on line 88 which electrically actuates valve C.

Hydraulic actuator 74 is secured to a base member 45. Base member 45, stationary member 46 and motor 14 are all secured to a common frame or mechanical ground, as schematically indicated. Heaters 52 and 57 conveniently maintain the inserts 50 and 58 at a temperature somewhat below the melting point of the molding material. For example, polycarbonate has a glass transition temperature of 305° F.; and the temperature of the mold inserts may range between 210° and 295° F.

It may be assumed as a starting point that the mold members are separated. In the absence of hydraulic pressure on line 100 rod 75 is resiliently biased downwardly permitting the entire B side of the mold to move downwardly from the closed position shown. At the same time, in the absence of hydraulic pressure on line 97, rod 64 moves downwardly relative to mold member 55 from the position shown carrying with it piston 60 and insert 58. Valves C, D and E as well as controller 80 are provided with circuit ground connections, not shown.

Referring now to FIG. 2, at zero seconds of time, controller 80 provides an electrical signal to valve C which couples hydraulic pressure from source 90 through lines 98 and 100 to actuator 74. This moves rod 75 upwardly to the position shown thereby closing the mold. At this time the mold cavity is appreciably larger than its final size. At 3 seconds of time, controller 80 provides a signal on line 84 which opens valve D. Pneumatic pressure from source 76 is coupled through lines 78 and 79 to pneumatic actuator 42 which raises the control rod 40. Molten plastic at a predetermined temperature and pressure now flows through nozzle 38 and the cold runner 56 into the mold cavity, partially filling it. A three seconds duration of opening of valve D is shown by the dashed line; and an eighteen seconds duration is shown by the solid line. Valve D will close between 6 and 21 seconds of time. At 24 seconds of time controller 80 provides a signal on line 86 actuating valve E. Regulated hydraulic pressure on line 96 is coupled through line 97 to hydraulic actuator 66 moving piston 60 upwardly to substantially the position shown. This compresses the plastic within the mold to a predetermined pressure which is maintained while the article is cooling. To illustrate that the hydraulic pressure output of valve E may be adjusted to various different values by regulator 92, a low hydraulic pressure output of valve E is indicated by the dashed line and a high hydraulic pressure output of valve E is indicated by the solid line. During the period of cooling, there will be a slow and very slight contracting of the dimensions of the article and piston 60 will move upwardly to maintain a constant pressure in the mold. At 66 seconds of time controller 80 disables the signal on conductor 88 thereby closing valve C. Mold member B now moves downwardly thereby opening the mold. Since valve E is still open, piston 60 moves upwardly relative to mold member 55 from the position shown, thereby expelling the lens or finished article. A robot or other device, not shown, then removes the finished article from the separated mold parts A and B. At 69 seconds of time controller 80 disables the signal on line 86. Valve E closes; and piston 60 moves downwardly relative to mold member 55 below the position shown. Thereafter, at 72 seconds of time, one full cycle having been completed, controller 80 provides a signal on line 88 to valve C moving the mold part B upwardly again.

The parison mass injected varies linearly with the time of actuation of valve D. The molten plastic is highly viscous; and the flow is laminar. Accordingly the mass varies linearly with the pressure set by reference source 20, assuming that there is substantially no back pressure in the mold cavity. The molding time is highly dependent upon the temperatures at which mold inserts 50 and 58 are maintained by heaters 52 and 57. As these temperatures approach the 305° F. glass transition of polycarbonate, the molding time increases without limit. Typically the time for a molding cycle may range between one and three minutes, with two minutes being representative. The material in the "cold" runner 56 is considered part of the parison mass of the molded article, even though it is usually removed thereafter mechanically as by cutting or grinding. For some articles, valve 38 may be gated directly onto a surface of the article so that little or no further mechanical processing of the molded article is required.

For a lens of zero diopters having a thickness of 2 mm and a diameter of 76 mm, formed of polycarbonate having a specific gravity of 1.2, the mass is approximately 10.9 grams. In FIG. 3 there is shown the mass of a polycarbonate lens of 76 mm diameter relative to the 10.9 grams mass of a zero diopter lens having a thickness of 2 mm. In this figure, it is assumed that the lens includes a "planar" portion, wherein both front and back surfaces have the same curvature, and a further power portion having zero edge thickness for positive powers or zero center thickness for negative powers. The relative mass of positive lenses varies linearly from 1 at zero diopters to 2 at +4 diopters. The relative mass of negative lenses varies linearly from 1 at zero diopters to 3 at −4 diopters.

Referring now to FIG. 4 there is shown a semi-logarithmic graph of molding pressure versus diopters, from which it may be seen that representative pressures are 75 psi at −4 diopters, 184 psi at zero diopters and 450 psi at +4 diopters. The graph is substantially linear where diopters is plotted linearly and pressure in pounds per square inch is plotted logarithmically. It is especially important that the pressure be reduced for negative lenses. If an excessive pressure is maintained, the concave or inner surface of the finished lens flattens and does not maintain sufficient curvature. Accordingly the power of the lens is reduced in the center, introducing inadequate correction for a near-sighted eye and distortion of the field due to the change in power. From FIGS. 3 and 4 it may be noted that lenses of −2 and +4 powers have the same relative mass of 2 but require entirely different compression molding pressures. If the pressure is insufficient, there occur sinks or hollows on the convex or outer surface of the lens. At −4 diopters the pressure may range approximately between 67 and 90 psi; at zero diopters, approximately between 165 and 250 psi; and at +4 diopters the pressure may range approximately between 405 and 800 psi, assuming an intermediate 550° F. temperature of the molten plastic in barrel 16. The molding pressures vary inversely with the temperature set by reference source 26. The molding pressure P in pounds per square inch is approximately $$P \doteq U e^{.224D}$$

where U is a value ranging between a lower limit of approximately 165 pounds per square inch and an upper limit L in pounds per square inch of approximately $$L \doteq 205 + 45 e^{.25D}$$

where D is the power of the lens in diopters and e is the base of natural logarithms. The representative pressures shown and described in FIG. 4 are obtained with $U \doteq 184$. The lower limit of $U \doteq 165$ corresponds to roughly 90% of the representative pressures. The upper limit varies from $L \doteq 205$ at very large negative diopters, to $L \doteq 222$ at −4 diopters, to $L \doteq 250$ at zero diopters, to $L \doteq 328$ at +4 diopters, and to larger values at larger positive diopters.

FIG. 1 shows an embodiment of my invention wherein each of the four mold cavity pistons is subjected to a different pressure by means of a corresponding plurality of regulators 92.

FIGS. 5 and 6 show an embodiment of my invention wherein the hydraulic actuators each receive the same regulated pressure and a variable molding pressure is provided by machines having different mechanical advantages.

Referring now to FIG. 5, bracket 68 and yoke 70 are repositioned so that the axis of hydraulic actuator 66, which pivots on pin 72, is nominally horizontal. Pin 62 of piston 60 is connected to one end of a link 106 which acts as a connecting rod. A pin 110 is journaled in the other end of link 106 and in one end of a further link 108. The other end of link 108 is journaled in a pin 104 mounted on a bracket 112. Link 108 acts as an eccentric or crank. Pin 110 further journals the rod 64 of actuator 66. In FIG. 5, the article is a negative lens as in FIG. 1. In FIG. 5, links 106 and 108 each make an angle of approximately 40° to the horizontal; and the axis of rod 64 is rotated slightly counterclockwise from a horizontal position.

Referring now to FIG. 6, a different concave mold insert 51 is provided to produce a positive lens. Similarly, a different convex insert 59 is also provided to produce a positive lens. It will be noted that each of links 106 and 108 now make an angle of approximately 50° to the horizontal; and the axis of rod 64 is rotated slightly clockwise from the horizontal. This change in angular orientation of links 106 and 108 is obtained by reducing the height of insert 59 as compared with that of insert 58. In FIG. 6, as in FIG. 5, regulator 92 has one manual adjustment 94 to produce a single regulated pressure which is applied through line 96 to valve E and is further applied through each of lines 96a, 96b and 96c to corresponding valves for the other three molds.

Neglecting the slight change in angular orientation of the hydraulic actuator 66, and assuming that the distance between pins 110 and 72 is large compared with the length of links 106 and 108, the force of the hydraulic actuator may be assumed to be substantially horizontal and to the left. With this assumption it may be shown that the vertical force V on piston 60 is equal to one-half the horizontal hydraulic actuator force H multiplied by the tangent of the angle $\theta$ that links 106 and 108 make with the horizontal; that is, $V = \frac{1}{2} H \tan \downarrow$.

Thus in FIG. 5, where $\theta = 40°$ and $\tan \theta = 0.839$, the vertical force on piston 60 is 0.4195 of the horizontal force provided by hydraulic actuator 66. In FIG. 6 where $\theta = 50°$, and $\tan \theta = 1.192$, the vertical force on piston 60 is 0.596 of the horizontal force provided by hydraulic actuator 66. The ratio of vertical forces on piston 60 in FIGS. 6 and 5, for the same horizontal force from hydraulic actuator 66, is 0.596/0.4195 = 1.42 at the least. The ratio of forces in practice is somewhat greater than this. In FIG. 5, the slight counterclockwise rotation from horizontal of actuator 66 results in a slight downward force component; and the upward force on piston 60 is reduced by one-half of this downward force component. Similarly in FIG. 6, the slight clockwise rotation of actuator 66 results in a slight upward force component; and the upward force on piston 60 is augmented by one-half of this upward force component. When links 106 and 108 each make an angle of 45° to the horizontal, the axis of rod 64 may be horizontal. Links 106 and 108 need not have equal lengths; and connecting rod 106 may be either shorter or longer than eccentric crank 108.

The wide variation in powers shown in FIGS. 5 and 6 is only for illustrative purposes, since in the molding of four different lenses simultaneously, the lens powers are preferably fairly close to one another so that while the lenses are all different they are at least in the same "ball park". It will be noted that in FIGS. 5 and 6 the ratio of compression pressures is somewhat in excess of 1.42, whereas FIG. 4 indicates that the ratio of pressures between +4 and −4 power lenses may exceed six. Thus in one production run, the four mold cavities may provide lenses of respective powers −3.25, −3.5, −3.75 and −4. In another production run the four mold cavities may provide lenses of respective powers of +3.25, +3.5, +3.75 and +4. It is not necessary that the mold cavities provide lenses in successive quarter-diopter increments, since some powers may be in little demand or are overstocked. If the −0.25, 0 and +0.75 diopter lenses are overstocked, then in a further production run the four mold cavities may provide lenses having the respective powers −0.5, +0.25, +0.5 and +1.

The ratio of mechanical advantages of at least 1.42 in FIGS. 5 and 6 will permit the simultaneous molding of four lenses within a range of two diopters, as from −4 to −2, from −3 to −1, from −2 to 0, from −1 to +1, from 0 to +2, from +1 to +3, or from +2 to +4.

The mass flow through nozzle 38 is proportional to the reference pressure 20, the period of actuation of valve D during which the nozzle is open, and to the density of the molten molding material in barrel 16, and is inversely proportional to the viscosity of the molten molding material. The density and viscosity are both functions of the reference temperature 26; and both decrease with increase in temperature. The ratio of viscosity to density is the kinematic viscosity; and this is less temperature dependent. Thus the mass flow is proportional to the reference pressure 20 and to the period during which valve nozzle 38 is open, and is inversely proportional to the kinematic viscosity of the molten molding material. Nozzle 38 and cold runner 56 provide the two main restrictions to flow of the parison mass.

It will be seen that I have accomplished the objects of my invention. The injection of a predetermined parison mass into a mold cavity is governed by the period of actuation of a valve coupled to a supply of molten molding material at a predetermined temperature, and hence kinematic viscosity, and at a predetermined pressure. During the period of flow of the parison mass into the mold cavity, the pressure therein remains substantially constant so that the flow rate is proportional to the predetermined pressure of the supply of molding material. In the compression molding of a plurality of articles having different masses or shapes, the mold cavities are subjected to different pressures. These different pressures may be obtained by a corresponding plurality of unequally excited actuators or by employing machines of variable mechanical advantage driven by similarly excited actuators. A machine of variable mechanical advantage is achieved by providing a pair of links one of which functions as a pivotable eccentric or crank and the other of which functions as a connecting rod which interconnects the eccentric crank and a mold piston. Pivotable mounting of the actuators obviates cocking of the pistons under the actuator forces.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. For example, actuator 42 may be electrical or hydraulic instead of pneumatic. If actuator 42 is electrical, then it may be directly excited by line 84. Similarly, actuator 66 may be pneumatic or electrical; and if electrical then may be directly energized by line 86. Variation of the voltage on line 86 will directly vary the excitation of an electrical actuator 66. Individual variation of the voltages on lines 86a, 86b and 86c will vary the excitation of electrical actuators for the other three molds. Such a voltage variation is also indicated by the dashed and solid curves E of FIG. 2. Hydraulic actuator 74 may be pneumatic or electrical and if electrical may be directly energized by line 88. The sprue heater 34, the nozzle heater 44, the A side mold heater 52 and the B side mold heater 57 may comprise either electrical heating elements or fluids at elevated temperatures. The mold cavities may number either more or less than the four described and partially shown. While the B side of the mold has been shown to move vertically, it will be understood that the mold may be oriented in a more standard configuration where the B side moves horizontally, the parting plane P being vertical. Actuators 42, 66 and 74 may be double acting rather than being single acting in conjunction with resilient return biasing. Since the time of both opening and closing nozzle 38 by control rod 40 is of importance, actuator 42 is preferably double acting and may positively move rod 40 downwardly by coupling pneumatic source 76 through another valve to the upper end of actuator 42. Valve C and such other valve would be operated oppositely by controller 80 so that when valve D is closed, the other valve is open; and when valve E is open, the other valve is closed. Piston 60 may be of circular planform for some lenses, but may have other planforms such as elliptical, square or rectangular for other articles.

Toggle-clamp machines are well known to the art and comprise a pair of oppositely driven toggles which maintain parallelism of the B side spider or plate 53. Rather than using hydraulic actuator 74 as a directacting clamp, it may instead be used to drive a pair of toggles to obtain high clamping force between the A and B mold sides with low hydraulic pressure because of the high force multiplication which the toggles can provide.

It has been suggested that the total force on the B mold side may be used not only to clamp the A and B mold sides together but also to compress the mold cavity or cavities. Typically the clamping force for a four-lens mold is 100,000 pounds. The area of four 76 mm lenses is nearly 28 square inches. For −4 diopter lenses, the compression pressure is 75 psi; and the total compression force is 2100 pounds. The total force on the B mold side would thus be 100,000+2,100 =102,100 pounds. If there is an error of only ±1%, or ±1,000 pounds, in each of the total and clamping forces, then the compression force will be 2100±2000 pounds, an enormous and unacceptable error of ±95%. It will be appreciated that small errors in each of two large numbers cause larger and larger errors in their difference as the difference becomes smaller and smaller. I have found it far preferable directlY to control the compression pressure of each mold cavity independently of the force applied to the B mold side.

While my invention has particular application to the molding of a series of lenses of various powers and masses, it is generally applicable to the molding of various articles having different masses and shapes. It is, therefore, to be understood, that my invention is not to be limited to the specific details shown and described.

Having thus described my invention, what I claim is:

1. Apparatus for molding a first and a second article having different masses including in combination a first variable volume mold cavity adapted to form the first article, a second variable volume mold cavity adapted to form the second article, means for supplying molding material at predetermined temperatures sufficiently elevated to render it molten and at predetermined elevated pressures, means including a first valve for coupling the supplying means to the first cavity, means including a second valve for coupling the supplying means to the second cavity, each valve being normally closed and preventing the flow of molten material into a cavity, means opening the first valve for a first period of time to permit the flow into the first cavity of a mass of molten material at least equal to the mass of the first article, and means opening the second valve for a second and different period of time to permit the flow into the second cavity of a mass of molten material at least equal to the mass of the second article.

2. Apparatus as in claim 1 wherein during the periods of flow of the molten masses the cavities being only partially filled and the pressures therein remaining substantially constant.

3. Apparatus for molding an article including in combination a variable volume mold cavity adapted to form the article, means for supplying molding material at predetermined temperatures sufficiently elevated to render it molten and at predetermined elevated pressures, means including a valve for coupling the supplying means to the cavity, the valve being normally closed and preventing the flow of molten material into the cavity, and means opening the valve for a variable period of time to permit the flow into the cavity of a correspondingly variable mass of molten material, during the period of flow of the molten mass the cavity being only partially filled and the pressure therein remaining substantially constant.

4. Apparatus for compression molding an article including in combination a pair of mold sides, means including first means clamping the two sides together for providing a variable volume mold cavity adapted to form the article, and second means distinct from the first means and including an actuator operable while the mold sides are clamped together for compressing the mold cavity, the compressing means comprising means operable independently of the clamping means and including a machine having a variable mechanical advantage for coupling the actuator to the cavity.

5. Apparatus as in claim 4 wherein the machine comprises a pairs of links pivotally connected at a point and wherein the actuator comprises a pivotally mounted cylinder and a piston rod pivotally connected to one link adjacent said point.

6. Molding apparatus including in combination a variable volume mold cavity adapted when closed to form an article, means for closing the mold cavity, means for supplying a molding material at predetermined temperatures sufficiently elevated to render it molten and at predetermined elevated pressures, means including a valve for coupling the supplying means to the cavity, the valve being normally closed and preventing flow of molten material into the cavity, means opening the valve for a variable period of time to permit the flow into the cavity of a correspondingly variable mass of molten material, during the period of flow of the molten mass the cavity being only partially filled and the pressure therein remaining substantially constant, and means including an actuator for compressing the mold cavity, the compressing means comprising means independent of the mold cavity closing means and including a machine having a variable mechanical advantage for coupling the actuator to the cavity.

7. Apparatus as in claim 6 wherein the machine comprises a pair of links pivotally connected at a point and wherein the actuator comprises a pivotally mounted cylinder and a piston rod pivotally connected to one link adjacent said point.

8. Apparatus as in claim 6 wherein the article is one of a series of lenses including negative powers.

9. A method of compression molding one of a series of lenses comprising negative powers, wherein a variable volume mold cavity adapted to form a lens of the series is supplied with molten molding material, including the step of compressing the mold cavity to produce a predetermined pressure P of the molten molding material therein, wherein said pressure in pounds per square inch is approximately $$P \doteq U e^{.224D}$$

where U is a value ranging between a lower limit of approximately 165 pounds per square inch and an upper limit L in pounds per square inch of approximately $$L \doteq 205 + 45 e^{.25D}$$

where D is the power of the lens in diopters and e is the base of natural logarithms.

10. A method of compression molding one of a series of lenses comprising negative powers, wherein a variable volume mold cavity adapted to form a lens of the series is supplied with molten molding material at a predetermined temperature, including the step of compressing the mold cavity to produce a predetermined pressure P of the molten molding material therein, wherein said pressure in pounds per square inch is approximately $$P \doteq Ue^{.224D}$$

where U is a value ranging between a lower limit of approximately 165 pounds per square inch at a certain temperature of the molten molding material and an upper limit L in pounds per square inch at said certain temperature of approximately $$L \doteq 205 + 45e^{.25D}$$

where D is the power of the lens in diopters and e is the base of natural logarithms, the limits of the value of U varying inversely with variations in said predetermiend temperature from said certain temperature.

11. A method for controlling the mass of a molten material which flows from a source at elevated pressures through an initially closed valve to partially fill at a substantially constant lower pressure a variable volume mold cavity including the steps of opening the valve to permit flow of molten material from the source to the cavity, maintaining the valve open for a variable period of time to correspondingly vary the mass of molten material flowing into the cavity during said period, and closing the valve to stop the flow before the cavity becomes filled.

12. A method of controlling apparatus for compression molding a first and a second article having different shapes or masses, said apparatus including a first variable volume mold cavity adapted to shape the first article, a second variable volume mold cavity adapted to shape the second article, means for supplying the first and second cavities with predetermined masses of a molten molding material, the first and second cavities comprising respective first and second pistons, first means for compressing the first cavity to produce therein a first pressure of the molten material, the first compressing means comprising a first actuator and means for exciting the first actuator and first means mechanically coupling the first actuator to the first piston, and second means for compressing the second cavity to produce therein a second pressure of the molten material, the second compressing means comprising a second actuator and means for exciting the second actuator and second means mechanically coupling the second actuator to the second piston, the first and second coupling means having respective mechanical advantages, said method including a first step of so controlling the first and second compressing means as to produce a difference between said first and second pressures, the first step including the step of varying at least one of firstly the excitation of one of the actuators and secondly the mechanical advantage of one of the coupling means.

13. A method as in claim 12 wherein the first step includes the step of varying the excitation of one of the first and second actuators.

14. A method as in claim 12 wherein the first step includes the step of varying the mechanical advantage of one of the first and second coupling means.

* * * * *